United States Patent
Reitze et al.

(10) Patent No.: US 6,825,257 B1
(45) Date of Patent: Nov. 30, 2004

(54) POLYMER BLENDS WITH MOULD-RELEASE AGENTS

(75) Inventors: Burkhard Reitze, Bergisch Gladbach (DE); Raimund Zimmermann, Langenfeld (DE); Wilfried Haese, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/868,126

(22) PCT Filed: Dec. 9, 1999

(86) PCT No.: PCT/EP99/09693

§ 371 (c)(1),
(2), (4) Date: Jun. 14, 2001

(87) PCT Pub. No.: WO00/37550

PCT Pub. Date: Jun. 29, 2000

(30) Foreign Application Priority Data

Dec. 21, 1998 (DE) .......................... 198 59 050

(51) Int. Cl.[7] .......................... C08K 5/103; C08G 65/38
(52) U.S. Cl. ........................ 524/308; 524/311; 524/318; 524/540; 528/219; 428/64.2; 428/580
(58) Field of Search ................ 524/308, 311, 524/318, 540; 528/219; 428/64.2

(56) References Cited

U.S. PATENT DOCUMENTS

| | | | |
|---|---|---|---|
| 3,784,595 A | 1/1974 | Schirmer et al. ....... 260/18 TN |
| 4,131,575 A | 12/1978 | Adelmann et al. ..... 260/17.4 R |
| 4,670,479 A | 6/1987 | Miyauchi .................... 524/154 |
| 4,743,641 A | 5/1988 | Shizawa et al. ............ 524/317 |
| 4,762,873 A | 8/1988 | Miyauchi et al. ........... 524/128 |
| 5,710,204 A | * 1/1998 | Harke et al. |
| RE37,200 E | * 5/2001 | Dunay et al. |

FOREIGN PATENT DOCUMENTS

| | | |
|---|---|---|
| CA | 1109174 | 9/1981 |
| EP | 0 511 640 | 11/1992 |
| EP | 0 417 775 | 3/1999 |
| EP | 0 732 360 | 5/2000 |
| JP | 49-11949 | 2/1974 |
| JP | 60-81245 | 5/1985 |
| JP | 2-225558 | 9/1990 |
| JP | 3-217801 | 9/1991 |
| JP | 4-168151 | 6/1992 |

* cited by examiner

Primary Examiner—Tae H. Yoon
(74) Attorney, Agent, or Firm—Joseph C. Gil; James R. Franks

(57) ABSTRACT

A thermoplastic polymer mixture comprising at least on thermoplastic polycarbonate polymer, and at least one mold release agent including at least one polyol component, is described. At least one polyol component (I) of the mold release agent consists of a parent substance with at least 4 carbon atoms, at least 3 hydroxyl groups, at least one hydroxyl group esterified with an aliphatic carboxylic acid, and at least one free hydroxyl group.

17 Claims, No Drawings ial Application No. PCT/EP99/09693, filed 9 Dec. 1999, which
POLYMER BLENDS WITH MOULD-RELEASE AGENTS

CROSS REFERENCE TO RELATED PATENT APPLICATIONS

The present patent application claims the right of priority under 35 U.S.C. 119 and 35 U.S.C. 365 of International Application No. PCT/EP99/09693, filed 9 Dec. 1999, which was published in German as International Patent Publication No. WO 00/37550 on 29 Jun. 2000, which is entitled to the right of priority of German Patent Application No. 198 59 050.4, filed 21 Dec. 1998.

FIELD OF THE INVENTION

The present invention provides thermoplastic polymer mixtures containing at least one mould release agent with a polyol component consisting of a parent substance with 4 or more carbon atoms, 3 or more hydroxyl groups, more than one hydroxyl group esterified with aliphatic $C_1$–$C_{32}$ carboxylic acids and one or more than one free hydroxyl group, the use of such polyol components as mould release agents for thermoplastic polymer mixtures and moulded items made from these thermoplastic polymer mixtures.

BACKGROUND OF THE INVENTION

When processing thermoplastic polymer mixtures, the production of moulded parts some of which have extremely complicated spatial shapes is a main application. Mould release agents are added to the polymer mixture itself or placed in the machines during processing in order to ensure, or simplify still further, removal of the moulded parts from the mould. In addition, these are intended to improve the surface quality.

The disadvantage of this procedure is contamination of the product with additives which can have a detrimental effect on the moulded item during preparation, storage or use.

Esters of long chain fatty acids with hydroxy components, in particular glycerine, have proven useful in the prior art.

DE-OS-20 64 095 describes the addition to polycarbonates of fatty acid esters of trihydric alcohols as mould release agents.

DE-OS-25 07 748 describes the improvement in the mould release characteristics of polycarbonates due to the addition of polyalcohols completely esterified with fatty acids.

DE-OS 27 01 725 describes the addition of part-esters of specific alcohols to polycarbonates for the purpose of mould release.

JP-A-45-24 439 describes the addition to polycarbonates of part-esters in amounts of 0.05 to 5% for the purpose of mould release.

JP-A-72-45 934 describes antistatic-modified polycarbonates with 0.1 to 5 wt. % of fatty acid monoglycerides.

JP-A-60-81 245 describes the addition of part-esters to low-chlorine polycarbonates in order to prevent corrosion of the moulds.

JP-A-2-225 558 describes polycarbonate sheets which contain part-esters of polyols and aliphatic monocarboxylic acids.

Japanese patent application 90-12-510 describes substrates for CDs which consist of polycarbonate and contain 0.002 to 5% of fatty acid monoglycerides.

Japanese patent application 90-294 979 describes polycarbonates for optical discs which contain 0.06 to 0.09% of glycerine monostearate.

U.S. Pat. No. 4,131,575 describes the addition to polycarbonates of full esters of polyhydric alcohols or monoesters of polyhydric alcohols, to improve mould release.

U.S. Pat. No. 4,743,641 describes the addition of glycerine monostearate, diglyceride monostearate, glycerine monopalmitate or sorbitane monostearate to polycarbonates.

EP-A-205 192 describes polycarbonate mixtures to which has been added esters of glycerine and of pentaerythritol. Glycerine monostearate is preferred in that document.

EP-A-213 413 describes the addition of part-esters to polycarbonates for optical purposes.

EP-A-417 775 describes moulded items for optics made of polycarbonates which contain fatty acid monoglycerides.

EP-A-511 640 also describes the addition of part-esters to polycarbonates for optical purposes.

EP-A-732 360 describes polycarbonate mixtures with mixtures of glycerine monostearate and glycerine tristearate.

The mould release agents in the prior art, such as for example the frequently used glycerine monostearate, have the disadvantage that they can lead to reactions with the polycarbonate. This impairs the thermal and oxidative resistance of the materials which may be expressed, for example, by yellowing. This is undesirable, in particular for optical applications of polycarbonate. This applies in particular to processing processes which involve high thermal stress for the material or for applications which require special optical quality. The mechanical properties of the polymer may also be modified undesirably as a result of these reactions. In addition coatings may appear on parts of the machines.

In the case of fully esterified alcohol components, the mould release characteristics are inadequate.

There is therefore a constant demand for novel mould release agents for thermoplastic polymers such as, for example, polycarbonate and/or polycarbonate blends.

SUMMARY OF THE INVENTION

The object therefore consists of developing a mould release agent for polycarbonates which has a very low, or even zero, tendency to react under the conditions of preparation and processing, especially during the preparation of products for optical applications such as compact discs and digital versatile discs (DVDs), have a good mould release effect and thus lead to improved quality and higher data security in the case of optical applications. This is achieved by polymer mixtures according to the invention.

Accordingly, the present application provides thermoplastic polymer mixtures containing at least one polycarbonate and at least one mould release agent with at least one polyol component wherein at least one polyol component (I) consists of a parent substance with 4 or more carbon atoms, 3 or more, preferably 4 or more, hydroxyl groups, more than one hydroxyl group esterified with aliphatic carboxylic acids and one or preferably more than one free hydroxyl group.

DETAILED DESCRIPTION OF THE INVENTION

Thermoplastic aromatic polycarbonates in the context of the present invention are either homopolycarbonates or copolycarbonates; the polycarbonates may be linear or branched in a known manner.

These polycarbonates are prepared in a known manner from diphenols, carbonic acid derivatives, optional chain stoppers and optional branching agents.

Details of the preparation of polycarbonates have been presented in many patent documents over the last 40 years. By way of example, reference is made here only to Schnell, "Chemistry and Physics of Polycarbonates", Polymer Reviews, volume 9, Interscience Publishers, New York, London, Sydney, 1964, to D. Freitag, U. Grigo, P. R. Müller, H. Nouvertne', BAYER AG, "Polycarbonates" in Encyclopedia of Polymer Science and Engineering, volume 11, 2nd edition, 1988, pages 648–718 and finally to Drs. U. Grigo, K. Kirchner and P. R Müller "Polycarbonate" in Becker/Braun, Kunststoff-Handbuch, vol. 3/1, Polycarbonate, Polyacetale, Polyester, Celluloseester, Carl Hanser Verlag, Munich, Vienna 1992, pages 117–299.

Suitable diphenols for preparing polycarbonates are, for example, hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, α,α'-bis-(hydroxyphenyl)-diisopropylbenzenes, and their ring-alkylated and ring-halogenated compounds.

Preferred diphenols are 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)-propane, 2,2-bis-(3-chloro-4-hydroxy-phenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-3,3,5-trimethyl-cyclohexane and 4,4'-(m-phenylenediisopropylidene)-diphenol.

Particularly preferred diphenols are 2,2-bis-(4-hydroxyphenyl)-propane (BPA), 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 4,4'-(m-phenylenediisopropylidene)-bisphenol (CAS No: 13595-25-0) (BPM), 1,1-bis-(4-hydroxyphenyl)-cyclohexane and 1,1-bis-(4-hydroxyphenyl)-3,3,5-trimethylcyclohexane (TMC).

These and other suitable diphenols are described, for example, in U.S. Pat. Nos. 3,028,635, 2,999,835, 3,148,172, 2,991,273, 3,271,367, 4,982,014 and 2,999,846, in German patent documents 1 570 703, 2 063 050, 2 036 052, 2 211 956 and 3 832 396, in French patent document 1 561 518, in the monograph "H. Schnell, Chemistry and Physics of Polycarbonates, Interscience Publishers, New York 1964" and in Japanese patent documents 62039/1986, 62040/1986 and 105550/1986.

In the case of homopolycarbonates, only one diphenol is used; in the case of copolycarbonates, several diphenols are used.

Polymer mixtures which contain at least one polycarbonate with diol blocks made from bisphenol A and/or trimethylcyclohexyl bisphenol (TMC) are preferably used, preferably those chosen from the group of homopolymers of bisphenol A, copolymers of bisphenol A with TMC or of copolymers with 5 to 50 wt. % of TMC.

Suitable carbonic acid derivatives are, for example, phosgene or diphenyl carbonate.

Suitable chain stoppers are either monophenols or monocarboxylic acids. Suitable monophenols are phenol itself, alkylphenols such as cresols, p-tert.-butylphenol, p-n-octylphenol, p-iso-octylphenol p-n-nonylphenol and p-iso-nonylphenol, halogenophenols such as p-chlorophenol, 2,4-dichlorophenol, p-bromophenol, amylphenol and 2,4,6-tribromophenol and mixtures of these.

Preferred chain stoppers are phenol and/or p-tert.-butylphenol and/or p-cumylphenol.

Suitable monocarboxylic acids are benzoic acid, alkylbenzoic acids and halogenobenzoic acids.

Preferred chain stoppers are phenols of the formula (I)

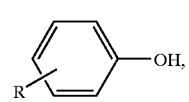

(I)

in which R is hydrogen, tert.-butyl or a branched or unbranched $C_8$ and/or $C_9$ alkyl group. However, p-cumylphenol may also preferably be used.

The amount of chain stopper to be used, preferably in a phase interface process, is 0.1 mol. % to 5 mol. %, with respect to the particular diphenols used. The addition of chain stoppers may take place before, during or after phosgenation.

Suitable branching agents are the trifunctional or more than trifunctional compounds known from polycarbonate chemistry, in particular those with three or more than three phenolic OH groups.

Suitable branching agents are, for example, phloroglucine, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis-(2-hydroxy-5'-methyl-benzyl)-4-methyl-phenol, 2-(4-hydroxyphenyl)-2-(2,4-dihydroxyphenyl)-propane, hexa-(4-(4-hydroxyphenyl-isopropyl)-phenyl orthoterephthalate, tetra-(4-hydroxyphenyl)-methane, tetra-(4-(4-hydroxyphenyl-isopropyl)-phenoxy)-methane and 1,4-bis-(4',4"-dihydroxytriphenyl)-methyl)-benzene and also 2,4-dihydroxybenzoic acid, trimesic acid, cyanuric chloride and for a few applications even preferably 3,3-bis-(3-methyl-4-hydroxyphenyl)-2-oxo-2,3-hydroindole.

The amount of optionally used branching agent is 0.05 mol. % to 2 mol. %, again with respect to the particular diphenols used.

The branching agent may either be initially introduced to the phase interface process in the aqueous alkaline phase with the diphenols and the chain stoppers or may be added dissolved in an organic solvent. In the case of a transesterification process, the branching agent is used together with the diphenols.

All these steps for preparing thermoplastic polycarbonates are familiar to a person skilled in the art.

Polyol components which can be used according to the invention are those with 4 to 12 carbon atoms, preferably 4 to 8 carbon atoms, particularly preferably 5, 6 or 7 carbon atoms, very particularly preferably 5 or 6 carbon atoms and even more preferably 5 carbon atoms.

Polyol components (I) with the following general formulae are preferred:

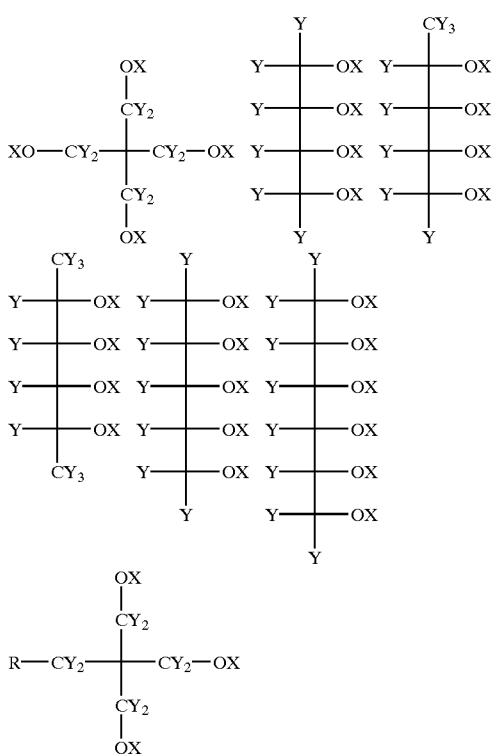

in which the substituents X, independently, are hydrogen atoms or aliphatic acyl groups, with the proviso that more than one X is an acyl group and more than one X is a hydrogen atom, and R is a hydrogen atom or a linear or branched $C_1$ to $C_{10}$ alkyl group, preferably methyl, ethyl or propyl.

The groups Y, independently, are hydrogen atoms, alkyl or aryl groups, wherein hydrogen atoms, methyl, ethyl, propyl, butyl and phenyl groups are preferred. Hydrogen atoms and methyl groups are particularly preferred. It is very particularly preferred that a carbon atom with a hydrogen substituent is not located immediately adjacent to a carbon atom with hydroxyl groups.

Preferred acyl groups X are fatty acid ester groups with 2 to 30 carbon atoms, particularly preferably $C_5$–$C_{25}$ fatty acids, very particularly preferably $C_8$–$C_{24}$ fatty acids and even more preferably $C_{12}$–$C_{22}$ fatty acid and mixtures of these. A person skilled in the art finds the best examples among $C_{16}$–$C_{20}$ fatty acids, more preferably $C_{16}$–$C_{18}$ fatty acids and mixtures of these.

Examples of such acyl groups are groups from acetic acid, propionic acid and butyric acid and also groups from myristic acid, palmitic acid or stearic acid, arachidic acid and behenic acid and mixtures of these, preferably mixtures of stearic acid and palmitic acid.

Polyol components in which the number of esterified and free hydroxyl groups is the same are preferred.

Preferred polyol components are diester derivatives of pentaerythritol, in particular diesters of pentaerythritol with stearic acid.

Polyol component (I) may be used in amounts of 0.005 wt. % to 0.5 wt. %, preferably 0.01 wt. % to 0.2 wt. %, very particularly preferably 0.015 wt. % to 0.1 wt. % and even more preferably 0.02 wt. % to 0.08 wt. %.

The polyol component may be used either as an individual substance or as a mixture of two or more polyol components and/or other components. The ratio of the amount of polyol component (I) in the mould release agent to other optionally present components in the mould release agent is preferably greater than 1:1.

A person skilled in the art obtains good results when the proportion of polyol components with less than one free hydroxyl group or polyol components with less than two esterified hydroxyl groups in the entire mould release agent are each less than 24 wt. %, preferably less than 20 wt. %, particularly preferably less than 15 wt. % and even more preferably less than 10 wt. %.

Conventional additives may be added, in known amounts, to the thermoplastic polycarbonates to be removed from moulds in accordance with the invention, for example stabilisers against the effects of heat, moisture and UV radiation, such as phosphorus compounds (such as phosphoric acid, phosphates, phosphites, phosphonites, etc.), optionally combined with monomeric or polymeric epoxides, N-containing heterocyclic compounds such as triazoles or benztriazoles, also flame retardants such as aliphatic or aromatic or perfluorinated aliphatic alkali metal or alkaline earth metal sulfonates, colorants, fillers, foaming agents, and antistatic agents. In the case of optical applications, those components which do not impair the transparency of the material are preferred.

Addition of the polyol component to the thermoplastic polycarbonates may take place, for example, by adding the polyol component during working up of the polymer solution of the thermoplastic polycarbonates or of the melt of the thermoplastic polycarbonates; addition preferably takes place when compounding the final, thermoplastic polycarbonates.

Conventional additives which are known for use with polycarbonates may be admixed in a known manner either before addition of the polyol component, when adding the polyol component or after addition of the polyol component to the polycarbonates.

The invention also provides use of polyol components (I) as mould release agents for thermoplastic polymer mixtures containing at least one polycarbonate.

The invention also provides moulded items made from the thermoplastic polymer mixtures mentioned above, preferably for optical applications, particularly preferably for optical data carriers, very particularly preferably for compact discs and DVDs.

Polycarbonates which are easy to remove from moulds, in accordance with the invention, may be further processed in the ways known for polycarbonates for optical applications, particularly preferably for optical data carriers, very particularly preferably compact discs and DVDs.

This processing may take place as a separate step using finally prepared polycarbonates which are easy to remove from moulds and which are obtained for example as granules. Processing may also take place, however, after incorporation of the polyol component and/or conventional additives.

EXAMPLES

The following mixture was prepared:

Example 1

99.96 wt. % polycarbonate granules of bisphenol-A-PC with tert.butylphenol terminal groups and an average solution viscosity of 1.20 (measured in methylene chloride at 25° C. and a concentration of 0.5 g in 100 ml of methylene chloride)

0.04 wt. % Loxiol EP 728 (fatty ester diester of pentaerythritol), Henkel KGaA and intensively mixed in a sealed container. Then the mixture was compounded on a twin-screw compounder of the Werner Pfleiderer ZSK 53 type at a bulk temperature of about 240° C.

Comparison Example 1
(without a Mould Release Agent)

Polycarbonate granules of bisphenol-A-PC with tert.butylphenol terminal groups and an average solution viscosity of 1.20 (measured in methylene chloride at 25° C. and a concentration of 0.5 g in 100 ml of methylene chloride) were compounded on a twin-screw compounder of the Werner Pfleiderer ZSK 53 type at a bulk temperature of about 240° C.

Comparison Example 2
(with Glycerine Monostearate)

The following mixture was prepared:

99.96 wt. % polycarbonate granules of bisphenol-A-PC with tert.butylphenol terminal groups and an average solution viscosity of 1.20 (measured in methylene chloride at 25° C. and a concentration of 0.5 g in 100 ml of methylene chloride)

0.04 wt. % Loxiol EP 129 (glycerine monostearate), Henkel KGaA and intensively mixed in a sealed container. Then the mixture was compounded on a twin-screw compounder of the Werner Pfleiderer ZSK 53 type at a bulk temperature of about 240° C.

Comparison Example 3
(with Pentaerythrityl Stearate)

The following mixture was prepared:

Example 1

99.96 wt. % polycarbonate granules of bisphenol-A-PC with tert.butylphenol terminal groups and an average solution viscosity of 1.20 (measured in methylene chloride at 25° C. and a concentration of 0.5 g in 100 ml of methylene chloride)

0.04 wt. % Loxiol P 861/3.5 (tetraester of pentaerythritol), Henkel KGaA and intensively mixed in a sealed container. Then the mixture was compounded on a twin-screw compounder of the Werner Pfleiderer ZSK 53 type at a bulk temperature of about 240° C.

Measuring the Static Friction

Static friction is the frictional index which is derived from the force required to set in motion bodies which are stationary with respect to each other (plunger/test item).

The coefficient of static friction is defined as follows:

$F_R = \mu * F_N$ (equ. 1)

after rearranging: $\mu = F_R/F_N$ (equ. 2)

$F_N$=normal force, $F_R$=frictional force, $\mu$=coefficient of friction

In the case of circular motion, the following relationship applies: $F_R = M_d/r_m$ (equ. 3) $M_d$=torque, $r_m$=average radius of area of friction (ring area)

$M_d/r_m = \mu * F_N$ (equ. 4)

after rearranging: $\mu = M_d/(r_m * F_N)$ (equ. 5)

In a special coefficient of friction mould, a disc-shaped test item with an outer diameter of 92 mm and a thickness of 2.6 mm is prepared. This has a 5 mm high and 3 mm wide ridge at the outer edge, on which are located flat indentations, comparable to a toothed belt disc, whereby the torque is transferred from the mould to the test item.

This enables direct determination of the coefficient of static friction (equ. 5) of a disc-shaped test item, immediately after it has solidified. The relationship that the frictional force is proportional to the torque (equ. 3) is used here. On opening the mould, a plunger connected to a torque sensor and with a defined normal force $F_N$ against the moulded part (friction partner) is introduced. On the other face of the moulded part, the test item is held in place and set in rotation. The coefficient of static friction between the plunger and the test item is determined from the torque measured at the plunger. Since the friction is caused by the unevenness of the surfaces slipping past each other (hooking into each other), the plunger was designed with an average surface roughness Ra=0.05 μm.

The materials (material 1 and comparison material 1, comparison material 2 and comparison material 3) were melted in an injection moulding machine and injected into the sealed coefficient of friction mould with a wall temperature of 100° C. at a melt temperature of 300° C. and retained for a period of 15 sec at a follow-up pressure of 550 bar.

After a residual cooling time of 20 sec, the mould was opened very slightly and the coefficient of friction was determined.

The following values were obtained:

| Material | Coefficient of static friction $\mu_0$ |
| --- | --- |
| Material 1 | 0.82 |
| Comparison material 1 | 1.07 |
| Comparison material 2 | 0.72 |
| Comparison material 3 | 1.04 |

It can be seen that with a small concentration of mould release agent only the product according to the invention and the comparison product with glycerine monostearate as mould release agent clearly lower the static friction.

Measuring Product Stability when Producing CDs

To measure the product stability, CD crude mouldings were prepared on a CD injection moulding machine of the Netsal Discjet 600 type using material 1 and comparison material 2 described above, these having a thickness of 1.2 mm and an outer diameter of 120 mm. In order to avoid scattering and diffraction of light in the colorometric measurements, a polished cavity plate without a pit structure was used. Processing of the materials took place with different machine settings:

Setting 1: Cylinder temperatures (feed end/compression/cylinder head/nozzle) 315/320/320/320° C. maximum rate of injection 130 mm/sec mould (initial temperature) 55° C.; cycle time 4.6 sec.

Setting 2: Cylinder temperatures (feed end/compression/cylinder head/nozzle) 315/340/350/350° C. maximum rate of injection 110 mm/sec mould (initial temperature) 55° C.; cycle time 4.9 sec.

Setting 3: Cylinder temperatures (feed end/compression/cylinder head/nozzle) 315/360/380/380° C. maximum rate of injection 100 mm/sec mould (initial temperature) 55° C.; cycle time 5.5 sec.

Setting 4: Corresponding to setting 2, wherein however the cycle is interrupted by a 5 minute machine stoppage. Each fifth disc after re-starting the injection moulding machine was used for the following measurements.

The melt viscosity, the yellowness index, the concentration of phenolic OH groups and the concentration of free tert.-butylphenol of the CD crude mouldings were measured. The following values were obtained:

TABLE 1

Melt viscosity in Pa*s (300° C./1000 s$^{-1}$)

| Sample | Setting 1 (320° C.) | Setting 2 (350° C.) | Setting 3 (380° C.) | Setting 4 (350° C. + stop) |
|---|---|---|---|---|
| Material 1 | 66 | 66 | 65 | 65 |
| Comparison material 2 | 63 | 63 | 63 | 61 |

TABLE 2

Yellowness index YI according to ASTM E 313

| Sample | Setting 1 (320° C.) | Setting 2 (350° C.) | Setting 3 (380° C.) | Setting 4 (350° C. + stop) |
|---|---|---|---|---|
| Material 1 | 1.02 | 1.02 | 1.02 | 1.38 |
| Comparison material 2 | 1.10 | 1.16 | 1.18 | 1.48 |

TABLE 3

Phenolic OH in ppm

| Sample | Setting 1 (320° C.) | Setting 2 (350° C.) | Setting 3 (380° C.) | Setting 4 (350° C. + stop) |
|---|---|---|---|---|
| Material 1 | 110 | 115 | 125 | 130 |
| Comparison material 2 | 120 | 130 | 135 | 145 |

TABLE 4

Free p-tert.-butylphenol in ppm

| Sample | Setting 1 (320° C.) | Setting 2 (350° C.) | Setting 3 (380° C.) | Setting 4 (350° C. + stop) |
|---|---|---|---|---|
| Material 1 | 6 | 6 | 8 | 11 |
| Comparison material 2 | 9 | 11 | 19 | 20 |

Description of the methods of measurement in detail:

a) Melt viscosity measurement in high-pressure capillary viscometer

The CD crude mouldings are cut into 6 to 8 mm strips and dried for 16 h at 110° C. under vacuum. Then the strips are inserted into a test channel heated to 300° C. (diameter 10 mm), melted and pushed with a plunger through a nozzle with a diameter of 1 mm and a length of 20 mm with a rate of shear of 1000 s$^{-1}$.

b) Yellowness index YI according to ASTM E 313

The measurement was made perpendicular to the surface of the CD at a radius of 40 mm.

c) Phenolic OH

The polycarbonate is dissolved in dichloromethane and titanium (IV) chloride is added, whereupon an orange-red complex is formed. The extinction of this complex is determined photometrically at 546 nm. Calibration is performed with bisphenol A as an external standard. The limit of determination is about 20 ppm OH.

d) Free p-tert.-butylphenol 10 g of polycarbonate are dissolved in methylene chloride and precipitated with acetone and methanol. The precipitated polymer is filtered off and the residual solution is concentrated down to about 20 ml. Then the solution is analysed using high-pressure liquid chromatography.

Chromatographic conditions: Reverse phase: C18; mobile solvent: water/acetonitrile (50%); flow: 1 ml/min; wavelength: 220 nm.

The test results demonstrate advantages for the material according to the invention in all the properties measured.

What is claimed is:

1. Thermoplastic polymer mixtures comprising:

(a) at least one polycarbonate selected from the group consisting of copolymers of bisphenol A with trimethylcyclohexyl bisphenol containing 5 to 50 wt. % of trimethylcyclohexyl bisphenol; and (b) at least one mould release agent with at least one polyol component;

wherein said polyol component (I) of said mould release agent is selected from at least one member of the group consisting of polyols represented by the following formulas,

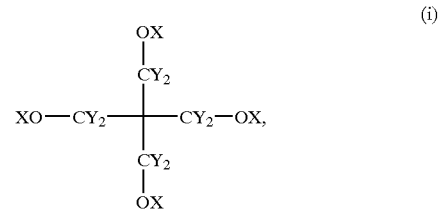

(i)

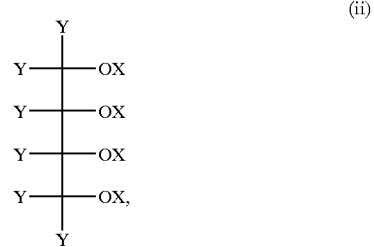

(ii)

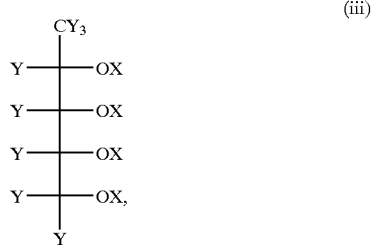

(iii)

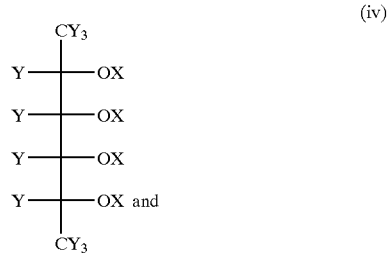

(iv)

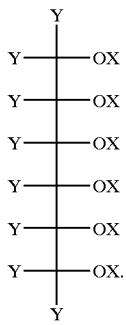

(v)

X independently represents a hydrogen or an aliphatic acyl residue of an aliphatic carboxylic acid, and Y independently represents a member selected from the group consisting of hydrogen, alkyl and aryl groups, said polyol component (I) having esterified groups and free hydroxyl groups, the number of esterified groups and free hydroxyl groups of said polyol component (I) being the same.

2. The thermoplastic polymer mixtures of claim 1 wherein the aliphatic carboxylic acids are selected from $C_2$–$C_{30}$ fatty acids and mixtures thereof.

3. The thermoplastic polymer mixtures of claim 1 wherein the polyol component (I) is present in amounts of 0.005 wt. % to 0.5 wt. %.

4. The thermoplastic polymer mixtures of claim 1 wherein in polyol component (I), a carbon atom with a hydrogen substituent is not located immediately adjacent to a carbon atom with a hydroxyl group.

5. The thermoplastic polymer mixtures of claim 1 wherein the ratio of the amount of polyol component (I) in the mould release agent to other optionally present components in the mould release agent is greater than 1:1.

6. The thermoplastic polymer mixtures of claim 1 further comprising at least one additive selected from the group consisting of stabilisers, flame retardants, antistatic agents, fillers, foaming agents and colorants.

7. Moulded articles made from the thermoplastic polymer mixtures of claim 1.

8. The thermoplastic mixtures of claim 2 wherein the aliphatic carboxylic acids are selected from the group consisting of $C_5$–$C_{25}$ fatty acids and mixtures thereof.

9. The thermoplastic mixtures of claim 2 wherein the aliphatic carboxylic acids are selected from the group consisting of $C_8$–$C_{24}$ fatty acids and mixtures thereof.

10. The thermoplastic mixtures of claim 2 wherein the aliphatic carboxylic acids are selected from the group consisting of $C_{12}$–$C_{22}$ fatty acids and mixtures thereof.

11. The thermoplastic mixtures of claim 2 wherein the aliphatic carboxylic acids are selected from the group consisting of $C_{16}$–$C_{20}$ fatty acids and mixtures thereof.

12. The thermoplastic mixtures of claim 2 wherein the aliphatic carboxylic acids are selected from the group consisting of $C_{16}$–$C_{18}$ fatty acids and mixtures thereof.

13. The thermoplastic mixtures of claim 3 wherein the polyol component (I) is present in amounts of 0.01 wt. % to 0.2 wt. %.

14. The thermoplastic mixtures of claim 3 wherein the polyol component (I) is present in amounts of 0.015 wt. % to 0.1 wt. %.

15. The thermoplastic mixtures of claim 3 wherein the polyol component (I) is present in amounts of 0.02 wt. % to 0.08 wt. %.

16. The moulded articles of claim 7 wherein said moulded articles are selected from the group consisting of compact discs and DVDs.

17. The thermoplastic polymer mixture of claim 1 wherein Y is selected independently from the group consisting of hydrogen, methyl, ethyl, propyl, butyl and phenyl groups.

* * * * *

UNITED STATES PATENT AND TRADEMARK OFFICE
CERTIFICATE OF CORRECTION

PATENT NO. : 6,825,257 B1
DATED : November 30, 2004
INVENTOR(S) : Burkhard Reitze et al.

It is certified that error appears in the above-identified patent and that said Letters Patent is hereby corrected as shown below:

<u>Title page,</u>
Item [57], ABSTRACT, delete "A thermoplastic polymer mixture comprising at least on thermoplastic polycarbonate polymer," and insert -- A thermoplastic polymer mixture comprising at least one thermoplastic polycarbonate polymer, --.

Signed and Sealed this

Twenty-second Day of March, 2005

JON W. DUDAS
*Director of the United States Patent and Trademark Office*